United States Patent Office 2,830,990
Patented Apr. 15, 1958

2,830,990

ORGANIC PIGMENT

William S. Struve, Chatham, N. J., assignor to E. I. du Pont de Nemours and Company, Wilmington, Del., a corporation of Delaware No Drawing. Application January 13, 1956
Serial No. 558,825

8 Claims. (Cl. 260—279)

This invention relates to new and useful compositions of matter. More particularly, it relates to the compound having the following structural formula:

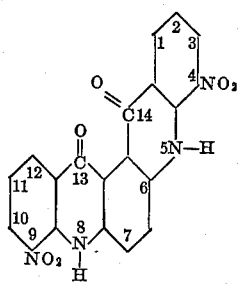

The above compound is 4,9-dinitroquin-(3,2-a)-acridine-13,14 (5,8)-dione, or it might also be referred to as dinitro angular quinacridone. The term, quinacridone, applies to a series of compounds having a structure which appears to be the condensation of a quinoline residue with an acridine residue, with 2 carbons of the condensation product oxidized to the quinone stage. From the above formula, it will be seen that the fusion between the acridine residue and the quinoline residue has resulted in an angular structure. This new product in fine particle size is a yellow-to-orange pigment possessing excellent lightfastness and substantial freedom from any tendency to bleed in solvents and chemical reagents.

Prior to applicant's invention, efforts to nitrate a quinacridone nucleus have been unsuccessful. When a nitrated starting material was used for the purpose of obtaining a nitrated quinacridone having a linear structure, the reaction would not proceed according to theorretical expectations, probably because of the oxidizing potential of the nitro group. On the other hand, attempts to directly nitrate an unsubstituted linear quinacridone structure resulted in gross decomposition. It has now been found, however, that the process of this invention makes it possible to obtain a nitrated quinacridone of the angular structure shown, and this is accomplished by the use of a nitrated starting material.

It is, therefore, an object of this invention to provide a new and useful process for preparing 4,9-dinitroquin-(3,2-a)-acridine-13,14 (5,8)-dione. It is a further object to prepare a new yellow-to-orange pigment which is extremely fast to light and highly resistant to any tendency to bleed in organic solvents or other reagents to which compositions containing such a pigment might be exposed.

These and other objects are accomplished by heating N,N'di - (2-carboxy-6-nitro-phenyl)-p-phenylenediamine having the following structural formula:

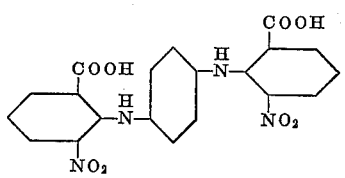

in a reaction medium such as phosphorus oxychloride. Under these conditions a double ring closure occurs in the above organic compound; each carboxyl group loses a hydroxyl group and bonds to the benzene ring of the diamine nucleus in the manner shown in the following structural formula:

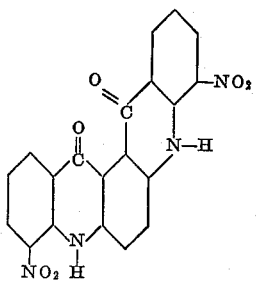

A preferred method for making the N,N'di-(2-carboxy-6-nitro-phenyl)-p-phenylenediamine consists of condensing a 2-halo-3-nitro-benzoic acid such as, 2-bromo-3-nitro-benzoic acid with p-phenylenediamine according to the following equation

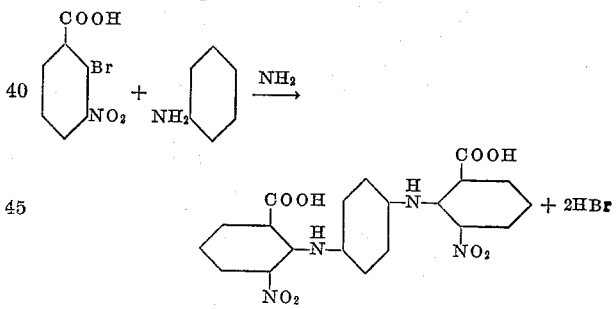

It is also possible to produce this phenylenediamine derivative using a 2-halo-3-nitro-benzoic acid in which the halo substituent is chlorine or iodine. Furthermore, the same end product can be obtained by condensing p-dichlorobenzene or p-dibromobenzene with 3-nitro-anthranilic acid.

In the preferred method of making the new product of this invention, 2-bromo-3-nitro-benzoic acid, p-phenylenediamine, potassium carbonate, and a catalytic amount of cupric acetate are incorporated into ethylene glycol. This charge is gradually heated to and then held at a temperature of about 125–145° C. to effect the reaction shown in the above equation. After this, the charge is cooled by dilution with water, acidified and the product filtered off and dried. The product thus recovered is then suspended in phosphorus oxychloride and heated near the boil to effect the ring closures. The phosphorus oxychloride is then removed by distillation under vacuum; and the product which is left is stirred into water; filtered; washed acid free; slurried with dilute alkali; again filtered and washed; and finally dried to give the new pigment as an orange colored powder. To convert this product to a finely divided form of greater utility as a pigment, it may be dissolved in sulfuric acid and reprecipitated by drowning in water, or it may be milled with salt in the well known salt milling method of reducing the particle size of pigments.

The following examples show the carrying out of this invention in detail. All parts are by weight.

Example I

To a solution of 4 parts of cupric acetate in 1,350 parts of ethylene glycol were added in turn, 196.8 parts of 2-bromo-3-nitro-benzoic acid, 110.4 parts of potassium carbonate, and 43.2 parts of p-phenylenediamine. The above proportions give approximately equivalent amounts of the reacting substances. The charge was heated for about 1½ hours at 35–45° C. After this, it was heated to about 60° C. and held for two hours at 60–80° C. It was then heated to 125° C. and held for about three hours at 125–135° C. The charge was then diluted with about 1,200 parts of water and filtered from any impurities. The filtrate was acidified with 80 parts of glacial acetic acid, with good agitation throughout, and the resulting solid was recovered by filtration, washing acid free, and drying to give about 78 parts of a powder which had a neutral equivalent (calculated equivalent weight based upon titration with alkali) of 255. This product thus obtained is an intermediate which is considered to be the result of the reaction between one molecule of p-phenylenediamine and one molecule of the bromo-nitro-benzoic acid. The reaction was then forced further toward completion by adding 105.3 parts of the product obtained by the above step to a solution of one part of cupric acetate in 900 parts of ethylene glycol followed by 95 parts of 2-bromo-3-nitro-benzoic acid and 86 parts of potassium carbonate. The charge was then heated to about 140 C. over a three hour period and held at that temperature for about three more hours. Finally, the charge was diluted with 800 parts of water and filtered, the filtrate was acidified with acetic acid, and the resulting solid was filtered off, washed and dried. There was obtained 116 grams of a product with a melting point of 280° C. and a neutral equivalent of 214 (the calculated neutral equivalent for $C_{20}H_{14}N_4O_8$ is 219). This material has the following structural formula:

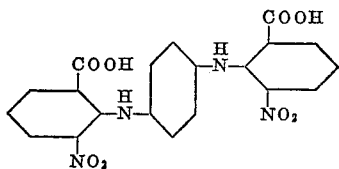

52 parts of the above compound and 260 parts of phosphorus oxychloride (a 1:5 ratio) were heated to the boiling point and maintained under reflux with agitation for about 1½ hours. Most of the phosphorus oxychloride was then removed by distillation under vacuum, and the remainder of the charge was added slowly to 1,500 parts of water and stirred further for about 1½ hours. The resulting solid was filtered off and washed acid free with water. It was then reslurried in about 3,000 parts of water containing about 30 parts of sodium carbonate and stirred for about one hour at 40° C. The resulting orange precipitate was filtered off (washed free of alkali and dried, giving 38 parts of the product of the following structural formula:

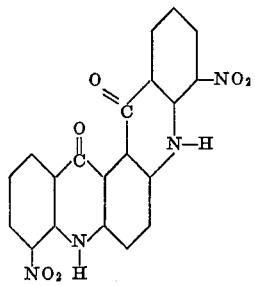

In order to obtain the product in a pure form, 88 parts of the dinitro angular quinacridone obtained above was dissolved in 880 parts of 96% sulfuric acid. Then, 415 parts of water was added drop-wise to give an orange colored precipitate which was filtered off, washed with 65% sulfuric acid, reslurried in water, filtered, washed acid free, and then dried to give an orange colored powder. If the acid solution of this color is drowned in a large volume of water, a product of very small particle size with excellent pigmentary properties is obtained. This small particle size product will dissolve in sulfuric acid to give a yellow solution and it may be reprecipitated unchanged by drowning in water.

Example II

To a solution of 6 parts of cupric acetate in about 1,500 parts of ethylene glycol, there were added in turn 395 parts (approximately 100% excess) of 2-bromo-3-nitro-benzoic acid, 220 parts of potassium carbonate and 43.2 parts of p-phenylenediamine. The charge was heated slowly over a three hour period to about 140° C. and maintained for three hours in the range of 135–145° C. Good agitation was maintained throughout the heating period. The charge was then diluted with about 1,500 parts of water and filtered from any impurities and finally acidified by adding about 150 parts of acetic acid to give a definitely acid reaction. The precipitated solid was filtered off, washed acid free and dried, giving a dry powder with a melting point of about 280° C. and a neutral equivalent of about 214. The cyclization with phosphorus oxychloride was carried out as in Example I to give a product which was identical with that obtained in Example I.

The cyclization of the N,N'di-(2-carboxy-6-nitrophenyl)-p-phenylenediamine to the angular quinacridone by reaction in phosphorus oxychloride ($POCl_3$) is the preferred method of operation, but a similar cyclization can be obtained by reaction in other strongly acid media such as concentrated sulfuric acid or concentrated phosphoric acid. The phosphorus oxychloride has the advantage of being a readily distillable compound, thus making it easy to recover. On the other hand, any of these cyclizing agents can be diluted with a large amount of water to precipitate the pigment, and recovery can be accomplished by filtration.

The conversion of the product resulting from the cyclization step to products of pigmentary properties requires some form of particle size reduction. Particle size may be measured by the specific surface area of the pigment, and a surface area greater than about 60 square meters per gram (as measured by the nitrogen absorption method of Emmett described in "Advances in Colloid Science," vol. 1, 1942) gives a suitable pigment in this invention. Such a particle size can conveniently be obtained by solution in sulfuric acid and reprecipitation by drowning in a large volume of water as shown in Example I. On the other hand, the particle size reduction may also be done by a salt milling operation in which one part of pigment and from four to ten parts of an inorganic salt, such as sodium chloride, are ground in a ball mill until the required particle size has been attained.

The pigment is then separated from the salt by extraction in dilute aqueous acid followed by filtration, washing acid free, and drying in a conventional manner. It is also possible to obtain a comparable particle size reduction by ball milling in certain organic solvents which can be removed by distillation and also by milling in water with finely divided inorganic salts under conditions of extremely high shear.

The yellow-to-orange pigment of this invention is suitable for all conventional pigment uses. It may be used to pigment paints, enamels, floorcoverings, paper and the like; and it gives a color with a high degree of lightfastness, good tinctorial strength, resistance to bleeding and durability in that portion of the color scale where previously pigments with such properties were hard to obtain.

I claim:

1. 4,9-dinitroquin-(3,2-a)-acridine-13,14 (5,8)-dione having the following structural formula:

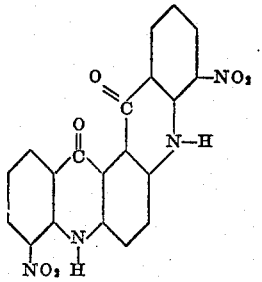

2. A pigment comprising 4,9-dinitroquin-(3,2-a)-acridine-13,14 (5,8)-dione having the structural formula

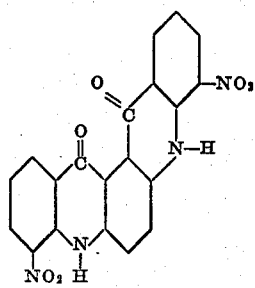

and having a surface area greater than about 60 square meters per gram.

3. A process for producing 4,9-dinitroquin-(3,2-a)-acridine-13,14 (5,8)-dione which comprises condensing 2 mols of a 2-halo-3-nitro-benzoic acid with 1 mol of phenylenediamine and recovering N,N'di-(2-carboxy-6-nitrophenyl)-p-phenylenediamine having the structural formula

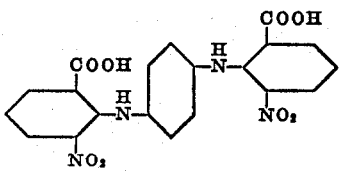

cyclizing the compound thus obtained by heating in a reaction medium consisting of phosphorus oxychloride, and recovering from said reaction medium 4,9-dinitroquin-(3,2-a)-acridine-13,14 (5,8)-dione.

4. The process of claim 3 in which the 2-halo-3-nitrobenzoic acid is 2-bromo-3-nitro-benzoic acid.

5. A process for producing 4,9-dinitroquin-(3,2-a)-acridine-13,14 (5,8)-dione which comprises condensing 2 mols of 2-halo-3-nitro-benzoic acid with 1 mol of phenylenediamine and recovering N,N'di-(2-carboxy-6-nitrophenyl)-p-phenylenediamine having the structural formula

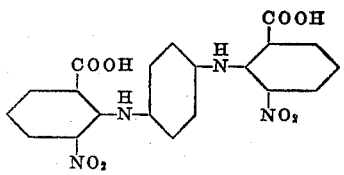

cyclizing the compound thus obtained by heating the latter suspended in phosphorus oxychloride at about the boiling point of the suspension, and then recovering from the phosphorus oxychloride 4,9-dinitroquin-(3,2-a)-acridine-13,14 (5,8)-dione.

6. A process for producing 4,9-dinitroquin-(3,2-a)-acridine-13,14 (5,8)-dione which comprises cyclizing N,N'di-(2-carboxy-6-nitro-phenyl)-p-phenylenediamine having the structural formula

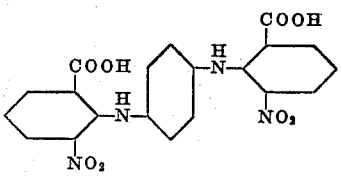

by heating the above compound in a reaction medium consisting of phosphorus oxychloride, and recovering from said reaction medium 4,9-dinitroquin-(3,2-a)-acridine-13,14 (5,8)-dione.

7. A process for producing 4,9-dinitroquin-(3,2-a)-acridine-13,14 (5,8)-dione which comprises heating one part by weight of N,N'di-(2-carboxy-6-nitrophenyl)-p-phenylenediamine having the structural formula

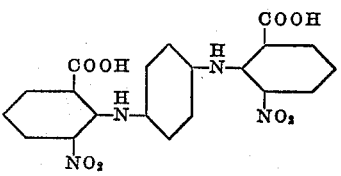

in 5 parts by weight of phosphorus oxychloride at the boiling point and then recovering from the phosphorus oxychloride 4,9-dinitroquin-(3,2-a)-acridine-13,14 (5,8)-dione.

8. A process for producing 4,9-dinitroquin-(3,2-a)-acridine-13,14 (5,8)-dione which comprises heating to 140° C. in about 3 hours and maintaining for about 3 hours at 135–145° C. a charge consisting of about 395 parts of 2-bromo-3-nitro-benzoic acid, about 1500 parts ethylene glycol, about 395 parts of potassium carbonate, about 43.2 parts of p-phenylenediamine and about 6 parts of cupric acetate, and then recovering N,N'di-(2-carboxy-6-nitro-phenyl)-p-phenylenediamine having the structural formula

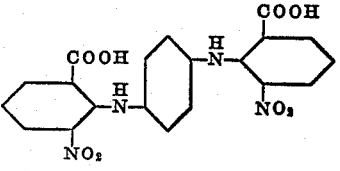

heating about 1 part of the compound thus obtained with about 5 parts of phosphorus oxychloride at the boiling point for about 1½ hours and then recovering 4,9-dinitroquin-(3,2-a)-acridine-13,14 (5,8)-dione.

References Cited in the file of this patent

J. Chem. Soc., 1952, pp. 1874–7, Badger et al.
Heterocyclic Compounds, Elderfield, 1952, N. Y., John Wiley, p. 536.
PBL–70, 336 (I. G. F.), Frames 7627–7632, Über chromierbare Diphenylamine und Akridone.
PBL–70, 332 (I. G. F.), Frames 1415–1419, Über chromierbare Diphenylamine und Akridone, II.